United States Patent
Singh et al.

(10) Patent No.: US 11,159,413 B2
(45) Date of Patent: Oct. 26, 2021

(54) SYSTEM AND METHOD OF IDENTIFICATION OF PACKET NODES

(71) Applicant: JIO PLATFORMS LIMITED, Ahmedabad (IN)

(72) Inventors: Siddharth Shanker Singh, Faridabad (IN); Gaurav Kumar, Mumbai (IN); Rishi Raj Koul, Mumbai (IN)

(73) Assignee: Jio Platforms Limited, Ahmedabad (IN)

( * ) Notice: Subject to any disclaimer, the term of this patent is extended or adjusted under 35 U.S.C. 154(b) by 0 days.

(21) Appl. No.: 16/879,623

(22) Filed: May 20, 2020

(65) Prior Publication Data
US 2020/0374209 A1 Nov. 26, 2020

(30) Foreign Application Priority Data
May 20, 2019 (IN) .............................. 201921019931

(51) Int. Cl.
*H04L 12/26* (2006.01)
(52) U.S. Cl.
CPC .......... *H04L 43/12* (2013.01); *H04L 43/0829* (2013.01); *H04L 43/10* (2013.01)
(58) Field of Classification Search
None
See application file for complete search history.

(56) References Cited

U.S. PATENT DOCUMENTS

| 9,438,486 | B2* | 9/2016 | Shaw | H04L 47/323 |
| 2004/0044764 | A1* | 3/2004 | Padmanabhan | H04L 12/2854 709/224 |
| 2016/0359872 | A1* | 12/2016 | Yadav | H04L 63/20 |
| 2017/0302524 | A1* | 10/2017 | Iorga | H04L 45/021 |
| 2019/0089599 | A1* | 3/2019 | Savalle | H04L 67/34 |
| 2020/0092172 | A1* | 3/2020 | Kumaran | H04B 17/345 |
| 2020/0213212 | A1* | 7/2020 | Dillon | H04L 41/0677 |

* cited by examiner

*Primary Examiner* — Natisha D Cox
(74) *Attorney, Agent, or Firm* — Klarquist Sparkman, LLP

(57) ABSTRACT

System and method for identifying nodes with packet loss in a wireless communication network. The method comprises a central probe server—establishing a TWAMP session with a plurality of nodes. The central probe server probes the plurality of nodes for packet loss for a time duration ΔT and categorizes each of the plurality of nodes as one of violator node and non-violator node. A sectionalisation module retrieves a topology of the at least one violator node. The central probe server probes at least one neighboring node of the at least one violator node for packet loss for the time duration ΔT. The sectionalisation module identifies the at least one violator node as one of a silo node and a daisy chain node based on the probe of the at least one neighboring node.

14 Claims, 14 Drawing Sheets

SYSTEM AND METHOD OF IDENTIFICATION OF PACKET NODES

CROSS REFERENCE TO RELATED APPLICATIONS

This application claims priority to Indian Patent Application No. 201921019931, filed May 20, 2019, the disclosure of which is hereby incorporated by reference herein in its entirety.

FIELD

The embodiments of present invention relate to wireless and wireline communication and more particular identification of packet nodes in the network that are errant nodes in real time and are responsible for packet loss.

BACKGROUND

The following description of related art is intended to provide background information pertaining to the field of the invention. This section may include certain aspects of the art that may be related to various features of the present invention. However, it should be appreciated that this section be used only to enhance the understanding of the reader with respect to the present invention, and not as admissions of prior art.

Wireless communication networks are widely deployed to provide voice as well as data services. These wireless networks may be multiple-access networks which are capable of supporting multiple users by sharing the available network resources. Examples of multiple access network formats include Universal Terrestrial Radio Access Network (UTRAN), Evolved UTRAN (E-UTRAN), Code Division Multiple Access (CDMA) Networks, Time Division Multiple Access (TDMA) Networks, Frequency Division Multiple Access (FDMA) Networks, Orthogonal FDMA (OFDMA) Networks, and Single Carrier FDMA (SC-FDMA) networks. A typical wireless communication network may include a number of base stations or eNodeBs that support voice and data communication for multiple user equipments (UEs). In a traditional cellular deployment, suitable powered macrocell were deployed to cover sufficiently large areas. However, with macrocell only deployment suffers quick capacity degradation as the number of user equipment (UE) operating in the macrocell coverage areas increases.

Therefore, the telecom industry is advancing towards reinforcing the macrocell deployment with one or multiple small cell/Wi-Fi access point with backhaul of LAN on optic fiber placed at multiple strategic locations within one or more macro coverage areas, often referred to as Heterogeneous Network (HetNet). For instance, the macro cells are reinforced by low-powered small cells, micro cell base station, pico cell base station, or femto cell base station. Thus, to provide last mile connectivity and to reduce coverage blackspots in the network coverage area, service providers are deploying small cells and micro cells integrated with Wi-Fi access points over LAN in offices, malls, shopping complexes etc.

Wireless communications components in accordance with various disclosed aspects may be configured to wirelessly allow voice and data to user devices. The wireless communications component may operate using conventional wireless technologies such as 802.11 a/b/g/n/ac/ah. Moreover, the wireless communications component may be configured to broadcast a plurality of network identifiers (e.g., Service Set Identifiers (SSIDs)) to the user devices using a network identifier module. In one example, the wireless communications component may radiate SSID on the basis of different channels, different VLANs, VRF, IP-pools and/or using different physical layer technologies. The wireless communications component may also receive data from the user devices and mechanisms used in common communication devices (e.g., wireless routers commonly used in residential networking and ONT for Residential and SOHO) for transmitting and receiving data.

The integrity and performance of the network, a wireless or wireline or HetNet or any other network, is, thus, critical to assure the quality of service. Thus, a user's demand for essentially 100% "uptime" of the network is considered to be the most efficient KPI of the service provider to provide such service to users. The term "uptime" references the period in which access to the network, and the components thereof, are available. The term "downtime", also called a network outage, reference the time when the network is inaccessible to users. Although the elimination of all network outages is never a guarantee, managing the network infrastructure can assist in minimizing such outages and maximizing uptime.

Often the service providers are highly susceptible to degradation of key KPIs such as latency, jitter and packet loss along with the IP backhaul. Not only such KPI degradation requires an efficient mechanism of rectification, the detection of the KPI degradation also needs to be in real-time and at a regular pace. In such scenario, the key challenges faced by a service operator are, firstly, using a real-time approach for troubleshooting packet loss problem in a proactive manner as compared to traditional reactive approach where troubleshooting is difficult due to change in network characteristics with time. Secondly, determining pin-pointed nodes responsible for packet loss in a large network, and thirdly, reducing mean time to resolve packet loss for network nodes.

The traditional approach for finding section of the network experiencing packet loss in a service provider's network is using the protocol of ping and traceroute utilities. While pinging to each node from a source node gives out packet loss figures, it must be followed up with the traceroute utility. Traceroute is a widely used traditional utility but, unfortunately, it has major disadvantages. The challenges in the traditional traceroute method, when an ailment like packet loss is being diagnosed for the errant network section are detailed below. Firstly, in the Synthetic Trace based Approach, the trace of the route on which packet loss was detected is an assumption based and it is being assumed that the packets lost followed a path which the trace packet followed which may not necessarily be the case. Secondly, in the Hop oriented Investigation the traceroute requires to be repeated from source to destination and vice versa to finally arrive at hop causing the packet loss. The Hops are transmission links and do not necessarily cause the packet loss and hence further investigation is warranted. Thirdly, in the Reactive Approach the Traceroute, is "fired" after a period of packet loss is observed. There is no pattern recognition-based methodology that gives out results based on sustained behaviour over the user-defined time interval.

Another existing solution provides a proactive network analysis system in conjunction with the enhanced ping an enhanced traceroute tool to combine the functionality of the 'traceroute' and 'ping' programs in a single network diagnostic tool to identify the errant packet. Yet another existing solution provides the network loss locator from the network topology tree, wherein the network topology tree includes a model of a logical network over which the packet stream was transmitted from a stream source to the affected receivers, and the packet loss location corresponds to a lowest common ancestor node of at least two of the affected receivers. The affected receivers are determined by the network topology tree based on knowledge of a physical network topology in combination with an execution of multicast Physical Topology Management Information Base (MIB) to identify the errant packet. Yet another existing solution provides the performance information by the collector performing performance tests through the (e.g., PING, TRACEROUTE, HTTP GETs) against the applications. However, the current disclosure provides novel solution approach with co-relation of packet loss nodes with topology in time domain and sectional dissection of violator nodes into silo nodes and daisy chain based on time-based co-relation between packet loss and network topology. However, all of the above existing solutions for detecting the nodes responsible for packet loss violation are time intensive and manually not scalable for large service provider. Thus, there is a need for a solution that can determine pin-pointed errant nodes in real-time which are responsible for packet loss that are not only accurate but less time-consuming and scalable.

SUMMARY

This section is provided to introduce certain objects and aspects of the technoloiges in a simplified form that are further described below in the detailed description. This summary is not intended to identify the key features or the scope of the claimed subject matter.

In order to overcome at least a few problems associated with the known solutions as provided in the previous section, an object of the present invention is to provide a method and a system for identifying nodes with packet loss in a wireless communication network comprising a plurality of nodes. Another object of the present invention is to provide a method and a system for determining pin-pointed errant nodes in real-time which are responsible for packet loss in a wireless communication network. Yet another object of the present invention is to provide a method and a system for errant node identification.

Yet another object of the present invention is to provide a method and a system that drastically reduces the number of violator nodes on which troubleshooting has to be carried out. Yet another object of the present invention is to provide a method and a system that significantly reduces troubleshooting of the nodes out of total number of violator nodes. Yet another object of the present invention is to provide a method and a system that to reduce the mean time to resolve (MTTR) for packet loss. Yet another object of the present invention is to provide a method and a system for "self-healing" of performance degradation which can be addressed by the node itself using soft reset mechanisms or remote reconfigurations.

In order to achieve the aforementioned objectives, the present invention provides a method and system for mitigation of at least one aggressor cell. A first aspect of the present invention relates to a method for identifying nodes with packet loss in a wireless communication network comprising a plurality of nodes. The method comprises establishing, by a central probe server, a TWAMP session with the plurality of nodes. Next, the central probe server probes the plurality of nodes for packet loss for a time duration ΔT. Further, the central probe server categorizes each of the plurality of nodes as one of a violator node and a non-violator node. Subsequently, a sectionalisation module retrieves a topology of the at least one violator node. Next, the central probe server probes at least one neighboring node of the at least one violator node for packet loss for the time duration ΔT. Thereafter, the sectionalisation module identifies the at least one violator node as one of a silo node and a daisy chain node based on the probe of the at least one neighboring node.

Another aspect of the present invention relates to a system for identifying nodes with packet loss in a wireless communication network comprising a plurality of nodes. The system comprises a wireless network further comprising a central probe server and a sectionalisation module. The central probe server is configured to establish a TWAMP session with the plurality of nodes. The central probe server is also configured to probe the plurality of nodes for packet loss for a time duration ΔT. The central probe server is also configured to categorize each of the plurality of nodes as one of a violator node and a non-violator node. The sectionalisation module is connected to the central probe server, said sectionalisation module configured to retrieve a topology of the at least one violator node. The central probe server is further configured to identify at least one neighboring node of the at least one violator node for packet loss for the time duration ΔT. The sectionalisation module is further configured to identify the at least one violator node as one of a silo node and a daisy chain node based on the probe of the at least one neighboring node.

Yet another aspect of the present invention relates to a non-transitory computer readable medium comprising instructions for causing a computer to perform the method of establishing a TWAMP session between a central probe server and the plurality of nodes. Subsequently, the non-transitory computer readable medium causes the computer to probe the plurality of nodes for packet loss for a time duration ΔT and to categorize each of the plurality of nodes as one of a violator node and a non-violator node. Next, the non-transitory computer readable medium causes the computer to retrieve a topology of the at least one violator node, and to probe at least one neighboring node of the at least one violator node for packet loss for the time duration ΔT. Lastly, the non-transitory computer readable medium causes the computer to identify the at least one violator node as one of a silo node and a daisy chain node based on the probe of the at least one neighboring node.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
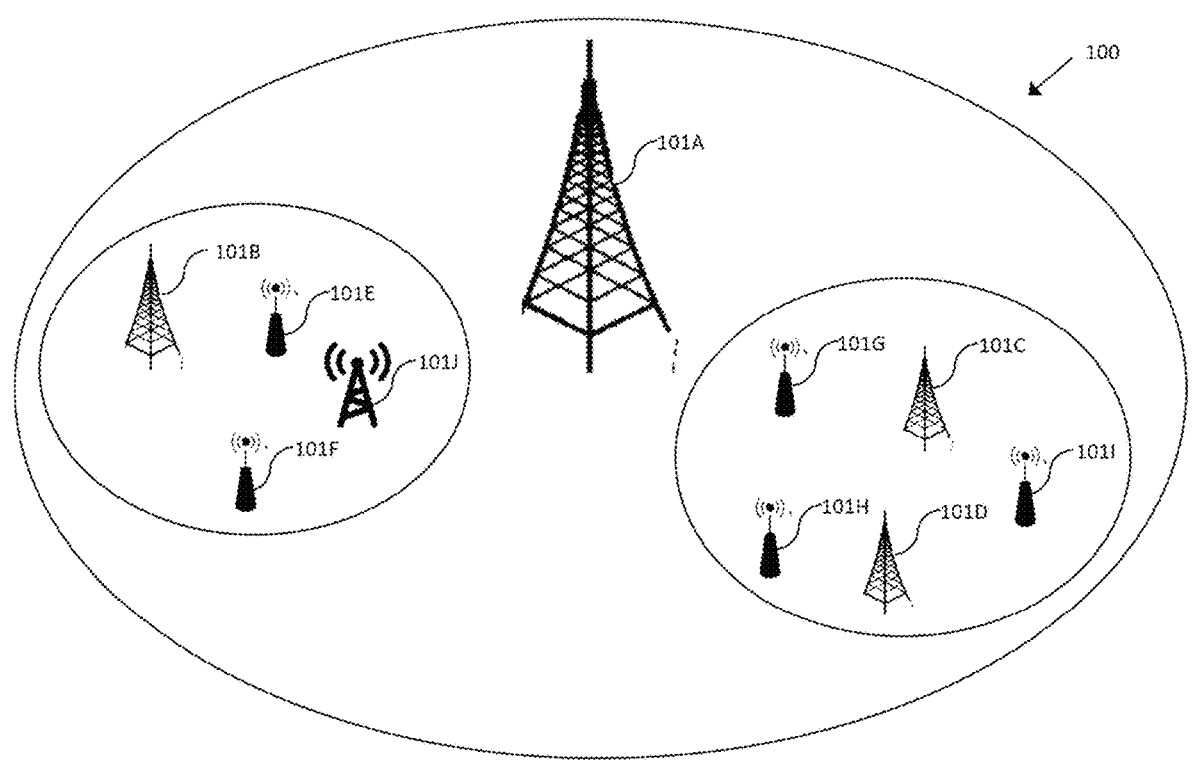
FIG. 1 illustrates an exemplary heterogeneous wireless communication network [100] diagram depicting a plurality of nodes connected to the wireless communication network [100, ] in accordance with exemplary embodiments of the present invention.

The foregoing shall be more apparent from the following more detailed description of the invention.

BRIEF DESCRIPTION OF THE EXEMPLARY EMBODIMENTS

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive).

Moreover, terms like "user equipment" (UE), "mobile station," "mobile subscriber station," "access terminal," "terminal," "handset," and similar terminology refer to a wireless device utilized by a subscriber or user of a wireless communication service to receive and/or convey data associated with voice, video, sound, and/or substantially any data-stream or signalling-stream. Further, the foregoing terms are utilized interchangeably in the subject specification and related drawings.

The terms "node", "local wireless communications cite," "access point" (AP), "base station," "Node B," "evolved Node B," "home Node B" (HNB), "home access point" (HAP), and the like are utilized interchangeably in the subject specification and drawings and refer to devices that can receive and transmit signal(s) from and to wireless devices through one or more antennas, or act as a wireless network component or apparatus that sends and/or receives data associated with voice, video, sound, and/or substantially any data-stream or signalling-stream between a set of subscriber stations—unless context warrants particular distinction(s) among the terms. Further, the data and signalling streams can be packetized or frame-based flows.

As used herein, a "plurality of base stations" may refer to two or more base stations or cells which provide a network coverage to a geographic coverage area, thus the geographic area served by the two or more cells is termed as coverage area of the two or more cells. The "at least one neighboring node" as used herein refers to an immediate and a directly connected neighbor node in a wireless communication network.

Furthermore, the terms "user," "subscriber," "customer," "consumer," "agent,"·"owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formulations, that can provide simulated vision, sound recognition, decision making, etc. In addition, the terms "wireless network" and "network" are used interchangeable in the subject application, unless context warrants particular distinction(s) among the terms.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, a "communication unit" or a "transceiver unit" may include at least one of a "transmitter unit" configured to transmit at least one data and/or signals to one or more destination and a "receiver unit" configured to receive at least one data and/or signals from one or more source. The "communication unit" or the "transceiver unit" may also be configured to process the at least one data and/or signal received or transmitted at the "communication unit" or the "transceiver unit". Also, the "communication unit" or the "transceiver unit" may further include, any other similar units obvious to a person skilled in the art, required to implement the features of the present invention.

As used herein, "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

As used herein, a "controller" or "control unit" includes at least one controller, wherein the controller refers to any logic circuitry for processing instructions. A controller may be a general-purpose controller, a special-purpose controller, a conventional controller, a digital signal controller, a plurality of microcontrollers, at least one microcontroller in association with a DSP core, a microcontroller, Application Specific Integrated Circuits, Field Programmable Gate Array circuits, any other type of integrated circuits, etc. The controller may perform signal coding, data processing, input/output processing, and/or any other functionality that enables the working of the system according to the present disclosure. More specifically, the controller or control unit is a hardware processor that comprises a memory and a processor. The memory is configured to store the modules and the processor is specifically configured to execute said modules to perform one or more processes which are described further below.

Hereinafter, exemplary embodiments of the present disclosure will be described in detail with reference to the accompanying drawings so that those skilled in the art can easily carry out the present disclosure.

Embodiments of the present disclosure may relate to a system and a method identifying nodes with packet loss in a wireless communication network [100]. The subject invention relates to a method and a system for accurately determining errant nodes in real-time which are responsible for packet loss in lesser time and on scalable operations. The solution of the present invention broadly encompasses co-relating the packet loss nodes with their topology in time domain followed by sectional dissection of violator nodes into silo nodes and daisy chain nodes based on time-based co-relation between packet loss and network topology. The conventional techniques do not provide an efficient way for detecting the nodes responsible for packet loss violation is time-intensive and manually not at all scalable for large service provider. Compared to such techniques, various methods and apparatus described herein facilitate to efficiently identify nodes with packet loss in a wireless communication network [100].

Referring to FIG. 1 illustrates an exemplary heterogeneous wireless communication network [100] diagram depicting a plurality of nodes connected to the wireless communication network [100], in accordance with exemplary embodiments of the present invention. As shown in FIG. 1, the wireless communication network [100 ] comprises a plurality of nodes [101A, 101B, 101C, 101D, 101E, 101F, . . . 101J, hereinafter collectively referred to as "101]" connected to each other. In an instance, the node [101A] is a macro base station providing wide area, nodes [101B, 101C, 101D] are low power base stations employed in service areas having a higher density of users requiring high data rates. The nodes [101E, 101F, . . . 101I] are micro base stations, and node [101J] is a micro base station integrated with Wi-Fi radio to provide multi-technology hotspot capacity. Each of the nodes may further comprise of a memory unit, a processor, and a communication unit, all the components are connected to each other and work in conjunction to achieve the objects of the present invention.

The wireless communication network may include a local wireless communication site (or base station), which can use a licensed radio spectrum operated and controlled by a wireless service provider. In another instance of the present invention, the network may be a wired network, a wireless network, or a combination thereof. The network may be a single network or a combination of two or more networks. Further, network provides a connectivity between the plurality of nodes [101]. The invention encompasses that a user equipment (or a user equipment) operated by a subscriber within a coverage area typically communicates with a core network via the base station. The user equipment can register with the base station and accordingly, the subscriber's communication, e.g., voice traffic, data traffic, can be routed to the subscriber through the base station utilizing the licensed radio spectrum. The base station can employ a backhaul network, e.g., broadband wired or wireless network backbone, to route packet communication, e.g., voice traffic, data traffic, data, to the core network.

Figure 2:
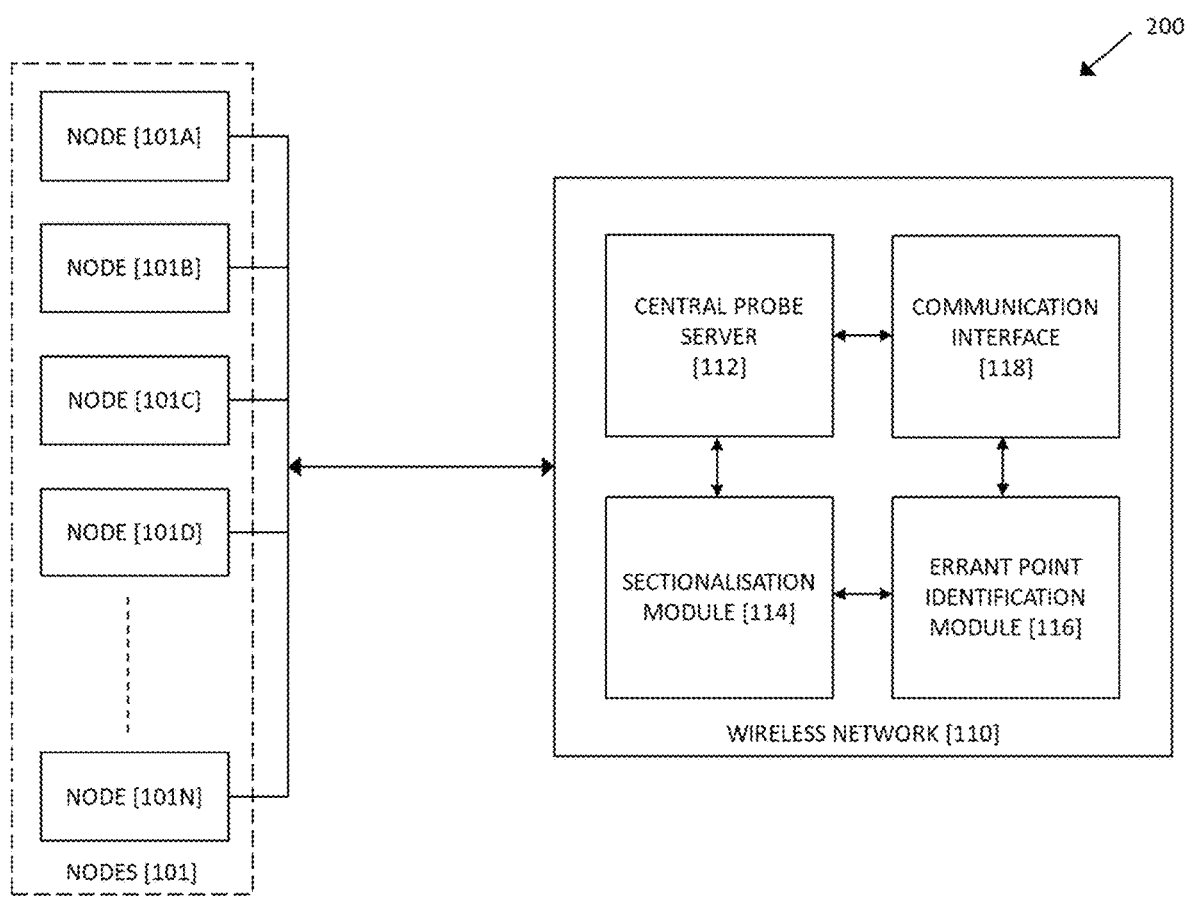
FIG. 2 illustrates an exemplary block diagram of a system for identifying nodes with packet loss in a wireless communication network [100], in accordance with exemplary embodiments of the present invention.

Referring to FIG. 2 illustrates an exemplary block diagram of a system for identifying nodes with packet loss in a wireless communication network [100], in accordance with exemplary embodiments of the present invention. The wireless communication network [100] comprises a central probe server [112], a sectionalisation module [114], an errant point identification module [116] and a communication interface [118], said components are connected to each other and work in conjunction to achieve the objects of the present invention. The plurality of nodes [101] are connected to the wireless communication network [100]. The communication interface [118] is configured to manage connections of the plurality of nodes [101] with the wireless communication network [100].

The central probe server [112] is configured to establish a Two-Way Active Management Protocol [TWAMP] session with the plurality of nodes [101]. The central probe server [112] is further configured to probe the plurality of nodes [101] for packet loss for a time duration $\Delta T$ over the TWAMP session. TWAMP is an open protocol for measuring network performance between any two devices in a network that supports the protocols in the TWAMP framework as also shown in FIG. 4.

Figure 4:
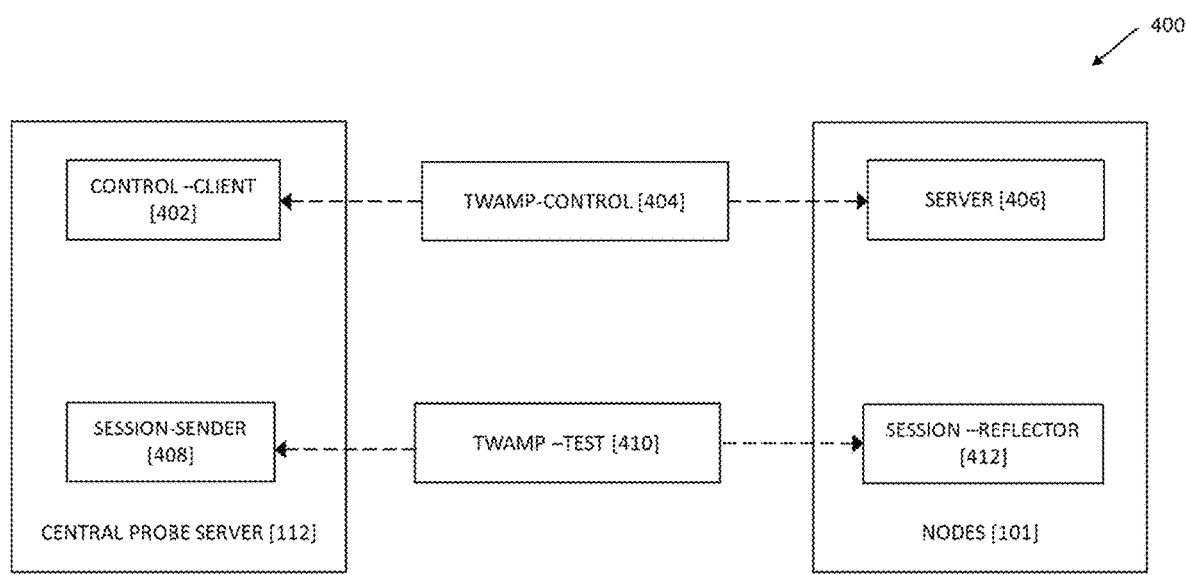
FIG. 4 illustrates an exemplary signal flow diagram of Two-Way Active Measurement Protocol (TWAMP), in accordance with exemplary embodiments of the present invention.

Accordingly, FIG. 4 illustrates an exemplary signal flow diagram of the TWAMP, in accordance with exemplary embodiments of the present invention. The TWAMP is used to check Service Level Agreement (SLA) compliance. TWAMP-Control messages [404] are exchanged between the control-client [402] and the server [406], and TWAMP-Test messages [410] are exchanged between the session-sender [408] and the session-reflector reflector [412]. In operation, the central probe server [112] acts as a control client [402] and a session-sender [408] to each of the plurality of nodes [101] and getting packet loss data (for instance, a count of packets lost during transmission) for each flow with a frequency of, say, 1 minute. Each of the plurality of nodes [101] acts as a server [406] and a session-reflector [412].

The central probe server [112] is further configured to categorize each of the plurality of nodes [101] as one of a violator node and a non-violator node. In operation, the central probe server [112] pre-defines a threshold value for packet loss, and accordingly detect violator and non-violator nodes for a particular time interval ΔT (1 minute in the previous example) based on the threshold value. In an instance of the present invention, there are separate violator nodes for voice packet loss and data packet loss.

The sectionalisation module [114] is configured to retrieve a topology of the at least one violator node identified by the central probe server [112]. The sectionalisation module [114] is also configured to maintain a topology database for the plurality of nodes [101]. Accordingly, when at least one node of the plurality of nodes [101] is identified as a violator node, the sectionalisation module [114] module retrieves the topology of the at least one violator node from the topology database. In another instance, the topology database also comprises information about the neighboring nods of each of the plurality of nodes [101. In an instance, the topology database comprises of topology information for a cell corresponding to a cell identification number, and accordingly, the sectionalisation module [114] uses the cell identification number of the at least one violator node to retrieve the topology.

The central probe server [112] is further configured to probe at least one neighboring node of the at least one violator node for packet loss for the same time duration ΔT. The central probe server [112] is configured to determine the at least one neighboring node for the at least one violator node based on the topology database. Accordingly, the central probe server [112] establishes a TWAM session with the the at least one neighboring node, and determines packet loss condition at the at least one neighboring node.

The sectionalisation module [114] is configured to identify the at least one violator node as one of a silo node and a daisy chain node based on the probe of the at least one neighboring node conducted by the central probe server [112]. The sectionalisation module [114] identifies the at least one violator node as a silo node in an event the central probe server [112] determines no packet loss for the at least one neighboring node of the at least one violator node for the time duration ΔT. The sectionalisation module [114] identifies the at least one violator node as a daisy chain node in an event the central probe server [112] determines packet loss for the at least one neighboring node of the at least one violator node for the time duration ΔT. The method followed by the sectionalization module [114] as described in further detail with reference to FIG. 8.

The present invention encompasses that the identified silo nodes ("standalone nodes") are troubleshooted by automatic soft reset of the silo nodes, or by implementing remote reconfigurations troubleshooting techniques. Further, the present invention also encompasses forming a daisy chain from the at least one violator node identified as a daisy chain node for the time duration ΔT. Accordingly, the errant point identification module [116] determines an apex node and a tail node for the at least one daisy chain, and recursively processes the apex node of the daisy chain to identify and troubleshoot the errant point in the at least one daisy chain, wherein the apex node is replaced by at least one immediate neighboring node of the apex node based on the processing and troubleshooting. The method followed by the errant point identification module [116] is described in detail with reference to FIG. 11.

Figure 3:
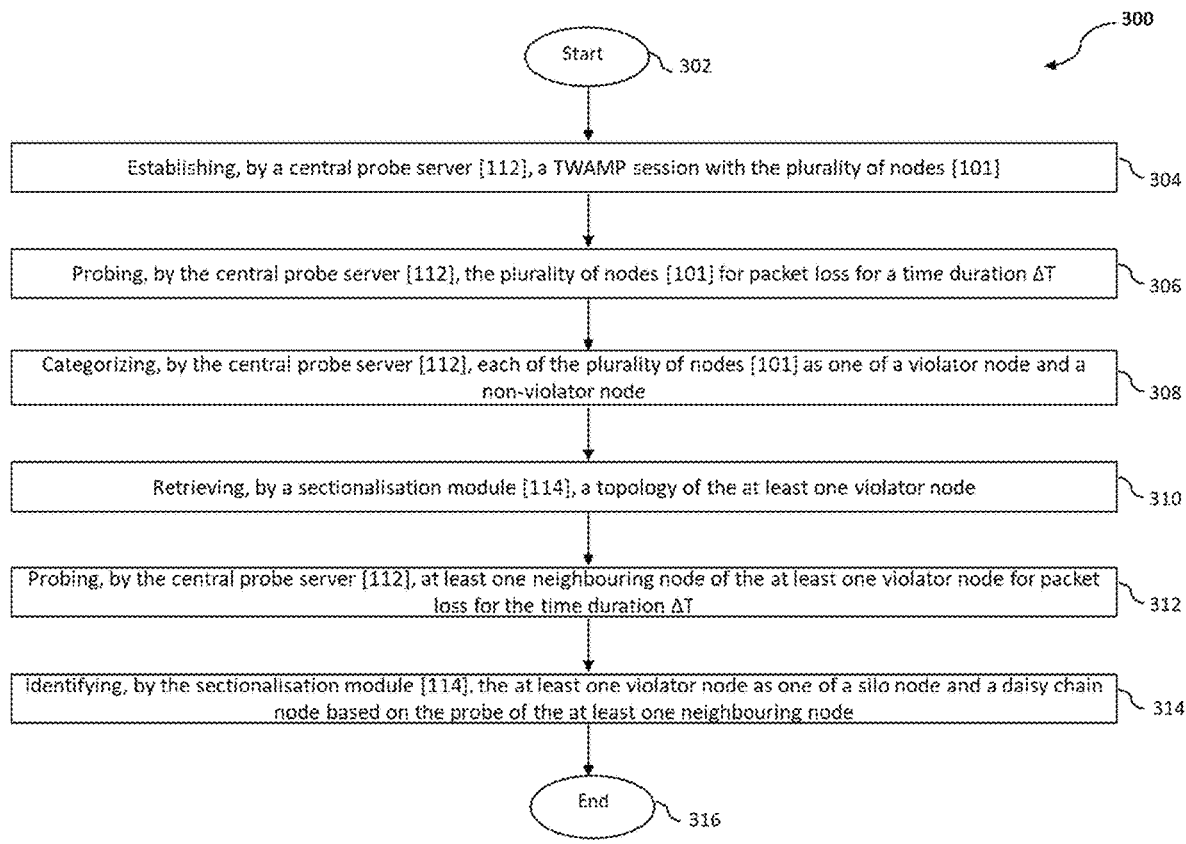
FIG. 3 illustrates an exemplary method flow diagram [300], depicting a method for identifying nodes with packet loss in a wireless communication network [100], in accordance with exemplary embodiments of the present invention.

Referring to FIG. 3 illustrates an exemplary method flow diagram [300], depicting a method for identifying nodes with packet loss in a wireless communication network [100], in accordance with exemplary embodiments of the present invention. The method starts at step [302]. At step [304] the central probe server [112] establishes a Two-Way Active Management Protocol [TWAMP] session with the plurality of nodes [101]. At step [306] the central probe server [112] probes the plurality of nodes [101] for packet loss for a time duration ΔT over the TWAMP session. As also described above with reference to FIG. 1, TWAMP is an open protocol for measuring network performance between any two devices in a network that supports the protocols in the TWAMP framework as also shown in FIG. 4.

The TWAMP is used to check Service Level Agreement (SLA) compliance. In operation, the central probe server [112] acts as a control client [402] and a session-sender [408] to each of the plurality of nodes [101] and getting packet loss data (for instance, a count of packets lost during transmission) for each flow with a frequency of, say, 1 minute. Each of the plurality of nodes [101] acts as a server [406] and a session-reflector [412].

At step [308] the central probe server [112] categorizes each of the plurality of nodes [101] as one of a violator node and a non-violator node. In operation, the central probe server [112] pre-defines a threshold value for packet loss, and accordingly detect violator and non-violator nodes for a particular time interval ΔT (1 minute in the previous example) based on the threshold value. In an instance of the present invention, there are separate violator nodes for voice packet loss and data packet loss.

At step [310] the sectionalisation module [114] retrieves a topology of the at least one violator node identified by the central probe server [112]. The sectionalisation module [114] maintains a topology database for the plurality of nodes [101]. Accordingly, when at least one node of the plurality of nodes [101] is identified as a violator node, the sectionalisation module [114] module retrieves the topology of the at least one violator node from the topology database. In another instance, the topology database also comprises information about the neighboring nods of each of the plurality of nodes [101. In another instance, the topology database comprises of topology information for a cell corresponding to a cell identification number, and accordingly, the sectionalisation module [114] uses the cell identification number of the at least one violator node to retrieve the topology.

At step [312] the central probe server [112] probes at least one neighboring node of the at least one violator node for packet loss for the same time duration ΔT. The central probe server [112] determines the at least one neighboring node for the at least one violator node based on the topology database. Accordingly, the central probe server [112] establishes a TWAMP session with the at least one neighboring node, and determines packet loss condition at the at least one neighboring node.

At step [314] the sectionalisation module [114] identifies the at least one violator node as one of a silo node and a daisy chain node based on the probe of the at least one neighboring node conducted by the central probe server [112]. The sectionalisation module [114] identifies the at least one violator node as a silo node in an event the central probe server [112] determines no packet loss for the at least one neighboring node of the at least one violator node for the time duration ΔT. The sectionalisation module [114] identifies the at least one violator node as a daisy chain node in an event the central probe server [112] determines packet loss for the at least one neighboring node of the at least one violator node for the time duration ΔT. The method followed by the sectionalization module [114] is described in further detail with reference to FIG. 8. The method completes at step [316].

The method further encompasses troubleshooting the identified silo nodes ("standalone nodes") by automatic soft reset of the silo nodes, or by implementing remote reconfigurations troubleshooting techniques. Further, the method encompasses forming a daisy chain from the at least one violator node identified as a daisy chain node for the time duration ΔT. Accordingly, the errant point identification module [116] determines an apex node and a tail node for the at least one daisy chain, and recursively processes the apex node of the daisy chain to identify and troubleshoot the errant point in the at least one daisy chain, wherein the apex node is replaced by at least one immediate neighboring node of the apex node based on the processing and troubleshooting. The method followed by the errant point identification module [116] is described in detail with reference to FIG. 11.

The technologies further encompass a non-transitory computer readable medium comprising instructions for causing a computer to perform the method of establishing a TWAMP session between a central probe server [112] and the plurality of nodes [101]. Subsequently, the non-transitory computer readable medium causes the computer to probe the plurality of nodes [101] for packet loss for a time duration ΔT and to categorize each of the plurality of nodes [101] as one of a violator node and a non-violator node. Next, the non-transitory computer readable medium causes the computer to retrieve a topology of the at least one violator node, and to probe at least one neighboring node of the at least one violator node for packet loss for the time duration ΔT. Lastly, the non-transitory computer readable medium causes the computer to identify the at least one violator node as one of a silo node and a daisy chain node based on the probe of the at least one neighboring node. Accordingly, the non-transitory computer readable medium causes the computer to perform all of the above method steps described in relation to FIG. 3, all of which is encompassed by the present invention.

Figure 5:
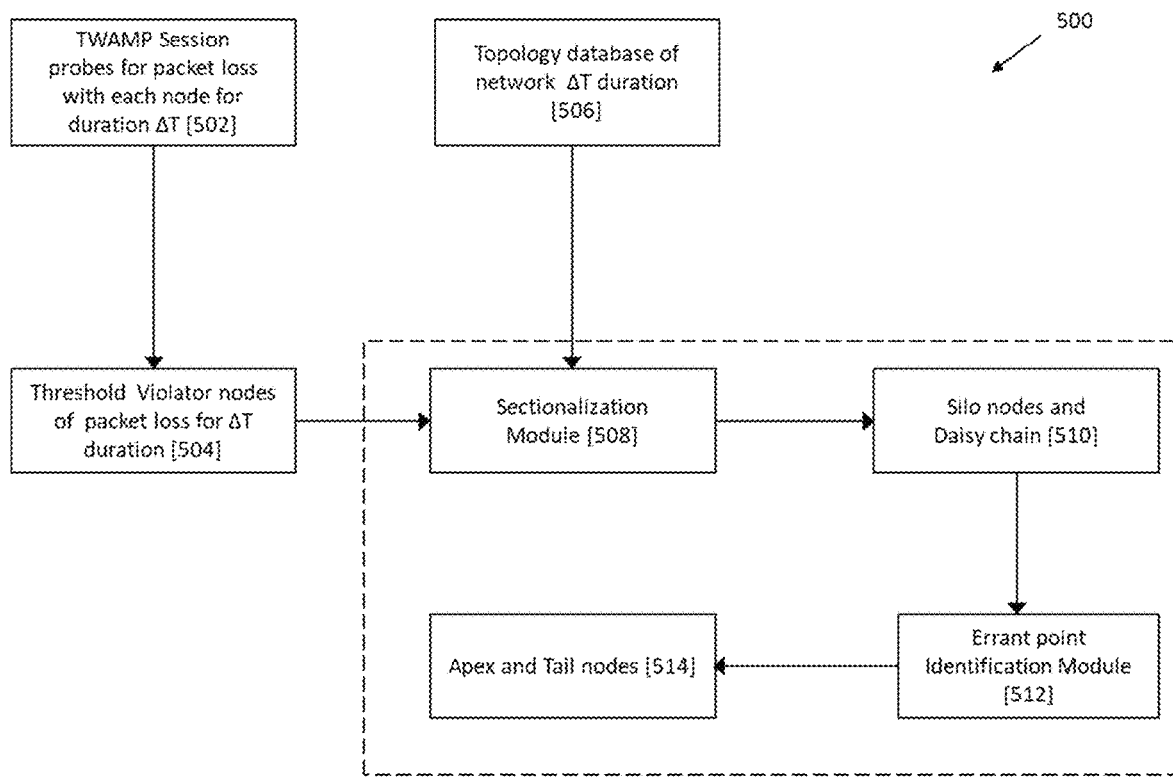
FIG. 5 illustrates an exemplary signal flow diagram depicting a method for identifying nodes with packet loss in a wireless communication network [100], in accordance with exemplary embodiments of the present invention.
Figure 7:
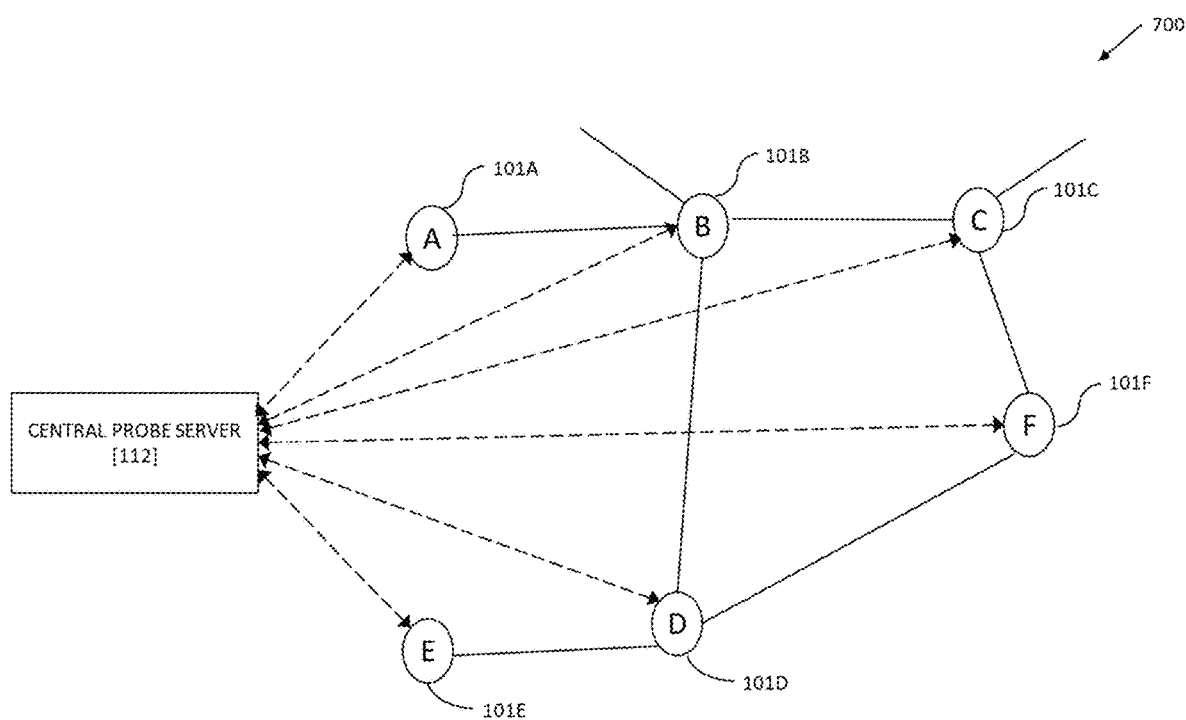
FIG. 7 illustrates an exemplary mapping of connection between the central probe server [112] and the plurality of nodes [101], in accordance with exemplary embodiments of the present invention.

Referring to FIG.5 illustrates an exemplary signal flow diagram depicting a method for identifying nodes with packet loss in a wireless communication network [100], in accordance with exemplary embodiments of the present invention. At step [502], a TWAMP session is conducted by the central probe server [112] acts as control client and session-sender to each of the plurality of nodes [101] and getting packet loss data for each flow with a frequency of 1 minute. The central probe server acts as "control-client and session sender" sends voice traffic and data traffic with a particular rate. All the nodes [101] in the network [100] act as "server" and "session-reflector". Accordingly, FIG.7 illustrates an exemplary mapping of connection between the central probe server [112] and the plurality of nodes [101], in accordance with exemplary embodiments of the present invention.

At step [504], the central probe server [112] pre-defines a threshold value for packet loss (for example, threshold count of packet loss) and categorizes each of the plurality of nodes [101] as a violator and a non-violator node for the particular time interval ΔT. The central probe server [112] identifies separate violator nodes for voice packet loss and data packet loss.

At step [506], the sectionalisation module [114] maintains a topology database of the complete wireless communication network [101]. The topology database is used in co-relating the plurality of nodes [101] exhibiting packet loss for the same interval of time ΔT. Further, at step [508], the sectionalisation module [114] extracts the packet loss count and topology of the violator nodes , and categorizes the violator nodes into silo nodes and daisy chain nodes at step [510] for the time interval ΔT based on the packet loss and topology of the violator node. The identified silo nodes are troubleshooted ("standalone nodes") by automatic soft reset of the silo nodes, or by implementing remote reconfigurations troubleshooting techniques.

In operation, the sectionalisation module [114] creates a node matrix (Eqn 1) comprising at least one violator node, and for which, the at least neighboring node of the said at least one violator node is to be found in an $i^{th}$ iteration to form a daisy chain. For instance, the node matrix is a 1×n matrix where n is number of nodes whose violator neighbors need to be found in that particular iteration for a given time interval ΔT. For the first iteration it will be a 1×1 matrix containing a single node.

$$\text{Node}(\Delta T) = \begin{bmatrix} node_1 \\ node_2 \\ \vdots \\ node_n \end{bmatrix}_{1 \times n} \quad \text{(Eqn 1)}$$

As a next step, the sectionalisation module [114] creates an mxn matrix representing neighbor nodes of the nodes of the node matrix, referred to as the "neighbor node matrix" (Eqn 2). This matrix is formed from the topology database of each node for the given time interval ΔT, assuming, the topology remains constant for ΔT time interval. Each row represents neighbor nodes of a particular node as given in node matrix, "m" represents maximum number of neighbor nodes for a particular neighbor out of all the n nodes of node matrix. For a node having x neighbors (here x<=m), remaining entries (m-x) x) for a particular row will have value 0.

$$Neighbor_{node}(\Delta T) = \quad \text{(Eqn 2)}$$

$$\begin{bmatrix} \text{neighbour }1_{node1} & \text{neighbour }2_{node1} & \cdots & \text{neighbour }m_{node1} \\ \text{neighbour }1_{node2} & \text{neighbour }2_{node2} & \cdots & \text{neighbour }m_{node2} \\ \vdots & \vdots & \cdots & \vdots \\ \vdots & \vdots & \cdots & \vdots \\ \text{neighbour }1_{noden} & \text{violator }2_{noden} & \cdots & \text{neighbour }m_{noden} \end{bmatrix}_{m \times n}$$

Subsequent to determining the neighbor node matrix, the sectionalisation module [114] identifies all the nodes with packet loss in the Neighbor node matrix to create a violator node matrix (Eqn 3). If a particular node is not a violator, replace that neighbor node with 0.

$$Violator_{node}(\Delta T) = \begin{bmatrix} violator\,1_{node1} & violator\,2_{node1} & \cdots & violator\,m_{node1} \\ violator\,1_{node2} & violator\,2_{node2} & \cdots & violator\,m_{node2} \\ \vdots & \vdots & \cdots & \vdots \\ \vdots & \vdots & \cdots & \vdots \\ violator\,1_{noden} & violator\,2_{noden} & \cdots & violator\,m_{noden} \end{bmatrix}_{m \times n}$$ (Eqn 3)

Subsequently, the sectionalisation module [114] creates a connectivity matrix (Eqn 4) from the violator node matrix by making pair of the violator nodes and node represented by (<violator node, node>) where value is non-zero in violator node matrix for the given time interval ΔT. The connectivity matrix will be used to extend Daisy chain connectivity from the node to the violator neighbor node for a particular iteration.

$$Connectivity_{node}(\Delta T) = \begin{bmatrix} (violator\,1_{node1}, & (violator\,2_{node1}, & \cdots & (violator\,m_{node1}, \\ node\,1) & node\,1) & & node\,1) \\ (violator\,1_{node2}, & (violator\,2_{node2}, & \cdots & (violator\,m_{node2}, \\ node\,2) & node\,2) & & node\,2) \\ \vdots & \vdots & \cdots & \vdots \\ \vdots & \vdots & \cdots & \vdots \\ (violator\,1_{noden}, & (violator\,2_{noden}, & \cdots & (violator\,m_{noden}, \\ node\,n) & node\,n) & & node\,n) \end{bmatrix}_{m \times n}$$ (Eqn 4)

The sectionalisation module [114] dynamically updates the node matrix by collecting all the non-zero values (violator neighbor nodes) from the violator node matrix and creating a 1xq matrix (Eqn 5) for a given time interval ΔT, "q" is count of the number of violator neighbor nodes of all the nodes.

$$Node(\Delta T) = \begin{bmatrix} violator\,1_{node1} \\ violator\,2_{node1} \\ \vdots \\ violator\,p_{node1} \\ violator\,1_{node2} \\ violator\,2_{node2} \\ \vdots \\ violator\,p_{node\,n} \end{bmatrix}_{1 \times q}$$ (Eqn 5)

The sectionalisation module [114] also maintains a Violator Database(ΔT) comprising all the packet loss threshold violator nodes continuously for a given time interval ΔT of the communication network [100]. The sectionalisation module [114] also maintains a daisy chain database(ΔT) comprising all the daisy chains with their unique Group ID for a given time interval ΔT of the complete network. The daisy chain database(ΔT) also comprises chain length representing number of nodes in a daisy chain. The chain length value is initialized to 1 initially. Its value is incremented in each iteration by number of violator neighbor node found. For a silo node this value is 1 always as it does not have any violator neighbor node. The daisy chain database(ΔT) also comprises a member list comprising list of nodes forming part of the at least one daisy chain. This list initially contains selected node from database in iteration 1. For the Silo nodes this will have only one member, and accordingly the silo nodes are troubleshooted by automatic soft reset of the silo nodes, or by implementing remote reconfigurations troubleshooting techniques . For daisy chain violator neighbor nodes, subsequently identified daisy chain nodes are appended to the member list on subsequent recursive iteration. Further, at step [512], an errant point identification module [512] receives the at least one daisy chain from the sectionalisation module [114]. The errant point identification module [512] identifies an apex node and a tail node for the at least one daisy chain at step [514], and recursively processes the apex node for troubleshooting such that the apex node is replaced by at least one immediate neighboring node of the apex node after the apex node is successfully troubleshooted. The operation of the errant point identification module [116] is described in detail with reference to FIG. 11.

Figure 6:
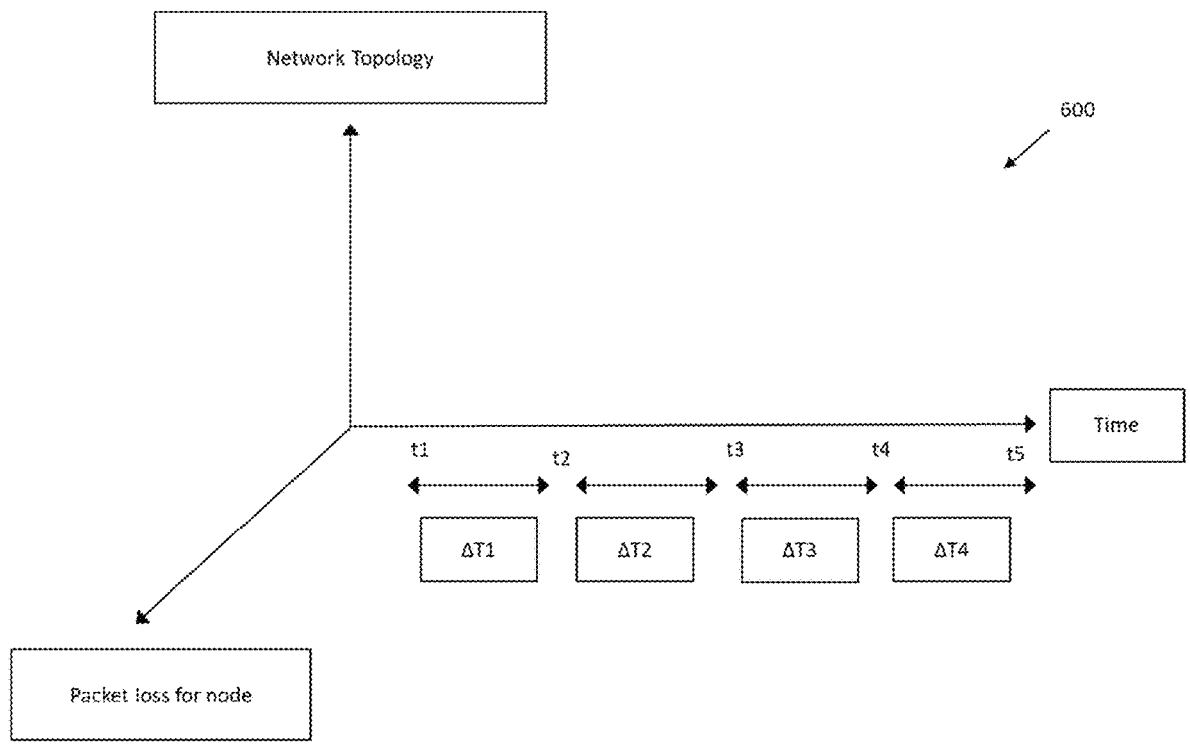
FIG. 6 illustrates an exemplary mapping of a correlation of packet loss with network topology in a given time interval ΔT, in accordance with exemplary embodiments of the present invention.

Referring to FIG. 6 illustrates an exemplary mapping of a correlation of packet loss with network topology in a given time interval ΔT, in accordance with exemplary embodiments of the present invention. For instance, the three different axis of the mapping relates to a network topology, a packet loss node and time interval (ΔT), and the violator nodes are plotted on the mapping based on their packet loss count and topology, thus, representing a correlation between the packet loss count and the network topology of the violator node for the time interval (ΔT).

Figure 8:
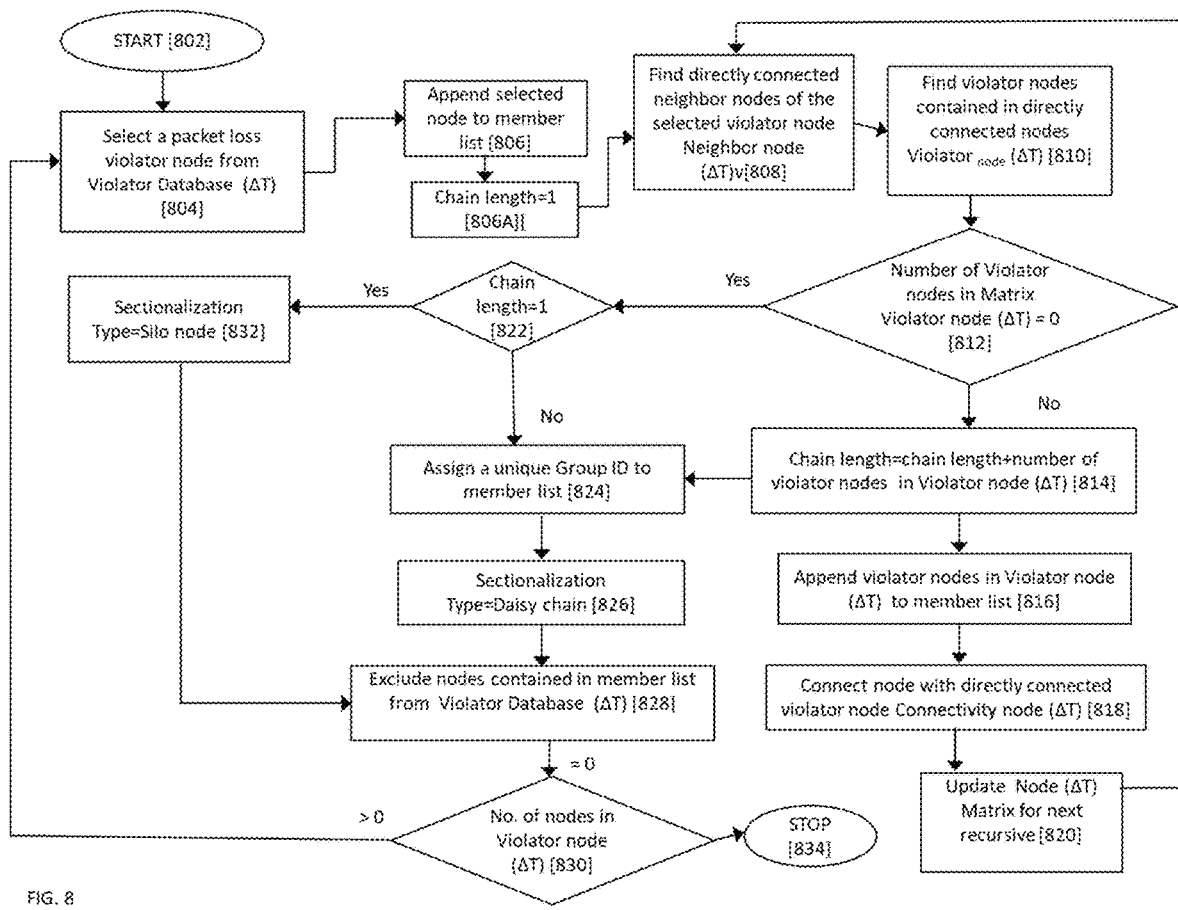
FIG. 8 illustrates an exemplary signal flow diagram depicting sectionalization of violator nodes, in accordance with exemplary embodiments of the present invention.

Referring to FIG. 8 illustrates an exemplary signal flow diagram depicting sectionalization of violator nodes, in accordance with exemplary embodiments of the present invention. The method starts at step [802]. At step [804], the central probe server [112] selects a packet loss violator node out of all the violators node for a given time duration ΔT and form a 1×1 Node (ΔT) matrix containing a single node. At step [806], the sectionalisation module [114] appends the selected violator node to the member list in the violator node database. At step [806A], the errant point identification module [116] initializes the chain length to 1 for the at least one daisy chain formed from the at least one violator node. At step [808], the central probe server [112] finds directly connected neighbor nodes of the selected violator node and for neighbor matrix Neighbor$_{node}$(ΔT). At step [810], the central probe server [112] finds violator nodes contained in directly connected neighbor nodes and form violator node matrix Violator$_{node}$(ΔT). At step [812], the sectionalisation module [114] checks if the number of nodes in matrix Violator$_{node}$(ΔT) is 0, and, at step [822] the sectionalisation module [114] checks if the chain length is 1, and accordingly marks the violator node type as "Silo Node" for that particular node. Accordingly, at step [828], the sectionalisation module [114] excludes this node from Violator$_{Database}$(ΔT) of time interval ΔT for next Daisy Chain/Silo node determination.

At step [824], if Number of nodes in matrix Violator$_{node}$(ΔT) is 0 and Chain length is greater than one, assign a unique Group ID members contained in member list and assign sectionalization type as "Daisy Chain" containing all the nodes of the member list at step [826]. Accordingly, at step [828], exclude all the nodes contained in member list node from Violator$_{Database}$(ΔT) list of time interval ΔT for the next Daisy Chain/Silo node determination. If the number of nodes in Violator$_{Database}$(ΔT) is greater than 0, go to Step 1 else stop this flow as sectionalization for all the violator nodes has been completed.

Alternatively, at step [812], if the number of nodes in Violator$_{Database}$(ΔT) is greater than 0, the method proceeds to Step [814], else stop this flow as sectionalization for all the violator nodes has been completed. At step [814], the sectionalisation module [114] checks if the number of nodes in matrix Violator$_{node}$(ΔT) is not 0, increment chain length as "Chain length=Chain length+number of violator nodes in a violator node matrix Violator$_{node}$(ΔT)". At step [816], the sectionalisation module [114] appends the violator nodes contained in matrix Violator$_{node}$(ΔT) to the member list.

At step [818], the method encompasses forming Connectivity$_{node}$(ΔT) matrix by connecting node contained in node (ΔT) matrix with its directly connected violator node contained in matrix Violator$_{node}$ (ΔT) and make daisy chain. At step [820], the node (ΔT) matrix is updated for next recursive iteration from nodes contained in Violator$_{node}$(ΔT) matrix, and the method proceeds to step [808] with updated Node (ΔT) matrix.

Figure 9:
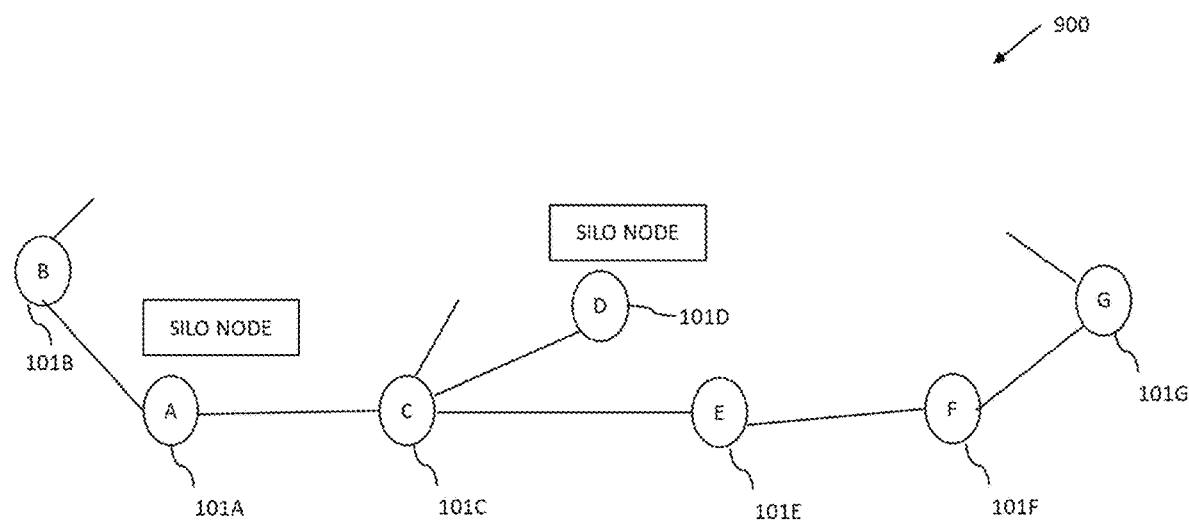
FIG. 9 illustrates an exemplary depiction of silo nodes in a wireless communication network, in accordance with exemplary embodiments of the present invention.

Referring to FIG. 9 illustrates an exemplary depiction of silo nodes in a wireless communication network, in accordance with exemplary embodiments of the present invention. Silo nodes exhibit packet loss violation, however, it's directly connected neighbor nodes does not exhibit packet loss threshold violation for the same time interval ΔT. The sectionalisation types for the silo nodes with network topology with interconnected nodes as provided in the FIG. 9 is elaborated in Table 1 below:

TABLE 1

Description of silo nodes network topology with interconnected nodes

| S. No. | Node | Packet loss Threshold Violator | Directly connected neighbors | Neighbor's packet loss threshold Violation | Number of directly connected Violator neighbor nodes | Silo node |
|---|---|---|---|---|---|---|
| 1 | A | Violator | B, C | Non-Violator, Non-Violator | 0 | Yes |
| 2 | B | Non-Violator | A | Violator | 1 | No |
| 3 | C | Non-Violator | A, D, E | Violator, Violator, Non-Violator | 1 | No |
| 4 | D | Violator | C | Non-Violator | 0 | Yes |
| 5 | E | Non-Violator | C, F | Non-Violator, Violator | 1 | No |
| 6 | F | Violator | E, G | Non-Violator, Violator | 1 | No |
| 7 | G | Violator | F | Violator | 1 | No |

Figure 10:
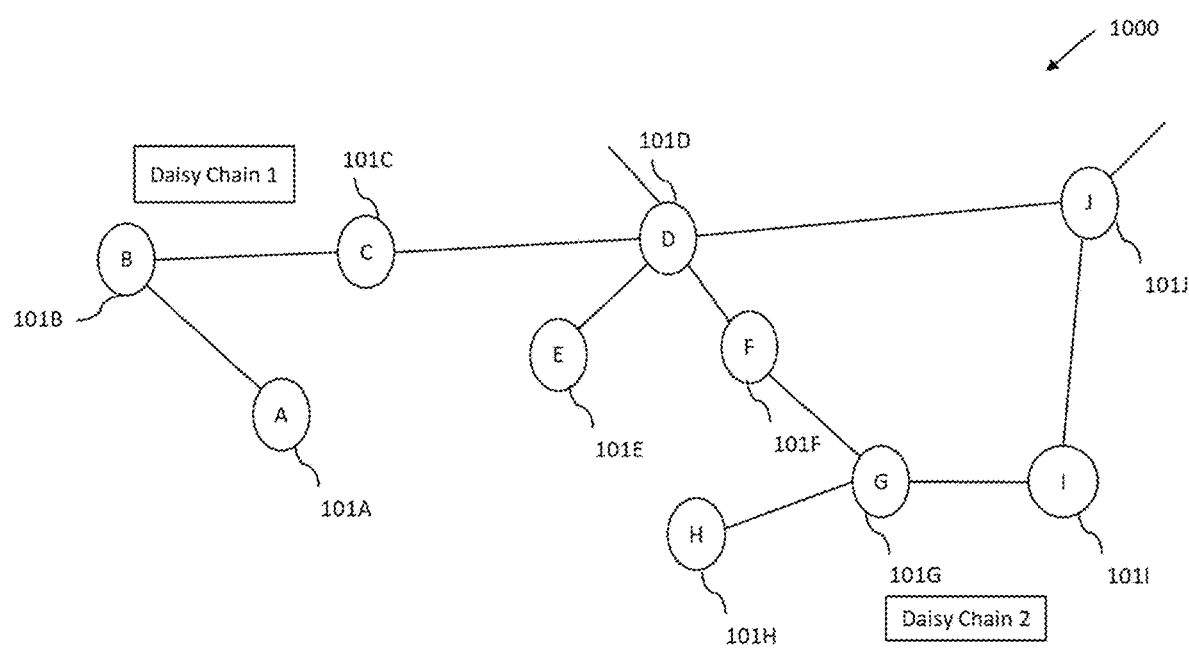
FIG. 10 illustrates an exemplary depiction of daisy chain nodes in a wireless communication network, in accordance with exemplary embodiments of the present inven

Referring to FIG. 10 illustrates an exemplary depiction of daisy chain nodes in a wireless communication network, in accordance with exemplary embodiments of the present invention. Daisy Chain nodes exhibits packet loss violation and its directly connected neighbor nodes also exhibit packet loss threshold violation for the same time interval ΔT. The directly connected packet loss threshold violator neighbors are found recursively to make violator chain. Each daisy chain is assigned a unique Group ID. The sectionalization types for the daisy chains with network topology with interconnected nodes as provided in the FIG. 10 is elaborated in Table 2 below:

TABLE 2

Description of Daisy Node with network topology with interconnected nodes

| S. No. | Node | Daisy Chain Group ID |
|---|---|---|
| 1 | A | Group 1 |
| 2 | B | Group 1 |
| 3 | C | Group 1 |
| 4 | H | Group 2 |
| 5 | G | Group 2 |
| 6 | I | Group 2 |

Figure 11:
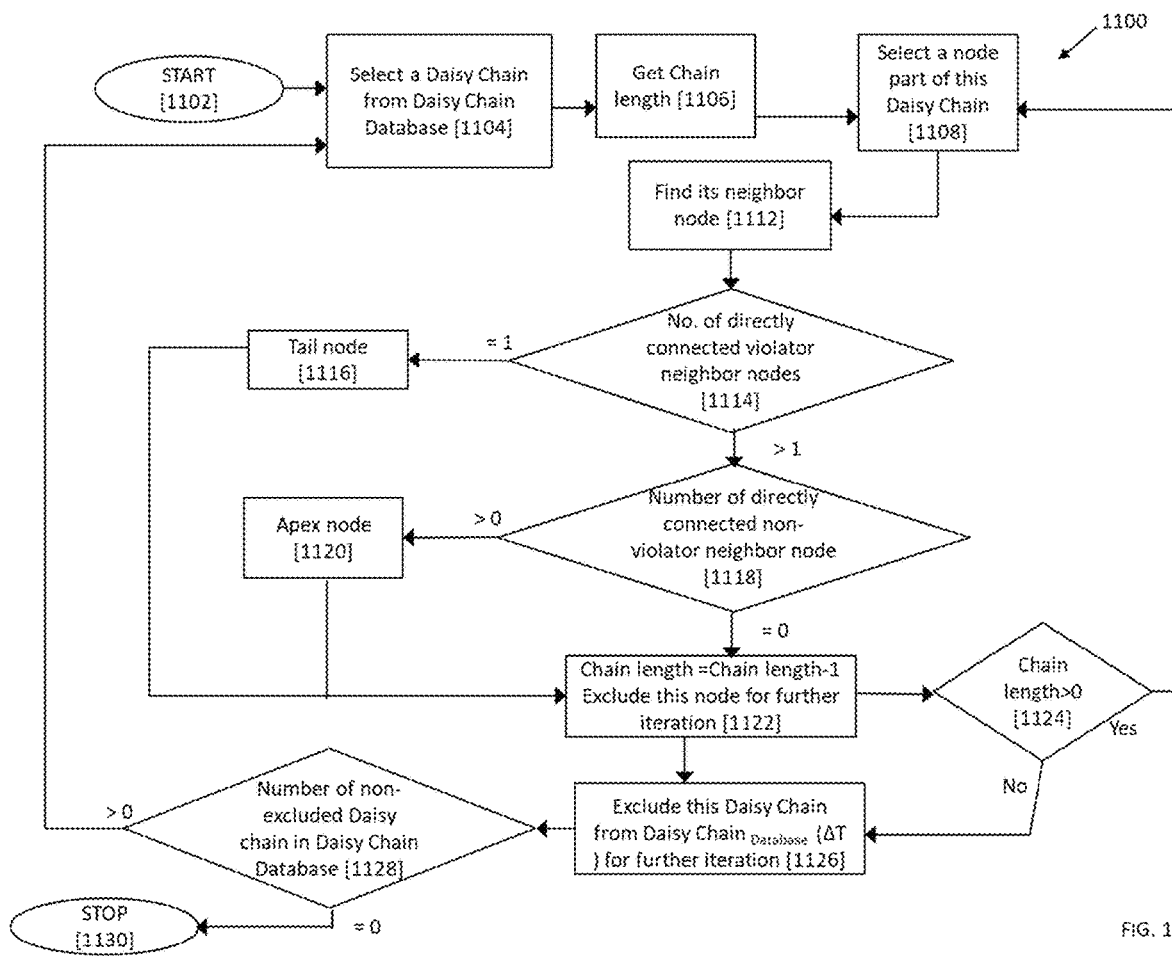
FIG. 11 illustrates an exemplary signal flow diagram depicting identification of apex node and tail node for a daisy chain, in accordance with exemplary embodiments of the present invention.

Referring to FIG. 11 illustrates an exemplary signal flow diagram depicting identification of apex node and tail node for a daisy chain, in accordance with exemplary embodiments of the present invention. The method starts at step [1102]. At step [1104], the method comprises selecting a Daisy Chain from the DaisyChain$_{database}$ for a given time interval ΔT. At step [1106], chain length of the selected Daisy Chain is determined. At step [1108], node which is member of the selected Daisy Chain is selected, and at step [1112] all neighbor nodes for the selected node are determined. At step [1114], the method checks if the number of directly connected violator neighbor nodes equals to 1, then mark those nodes as Tail node for that Daisy Chain at step [1116]. If the number of directly connected violator neighbor nodes is greater than 1 and the number of directly connected non-violator neighbor node is greater than 0, then mark the selected node as an Apex node at step [1120]. If the number of directly connected violator neighbor nodes is greater than 1 and number of directly connected non-violator neighbor node equals 0 then its neither Apex node nor Tail node, and the method flow proceeds to step [1122], and the chain length is updated as "Chain length=Chain length−1". At step [1126], the selected node is excluded from the daisy chain for further iteration as this node is already classified.

Figure 12:
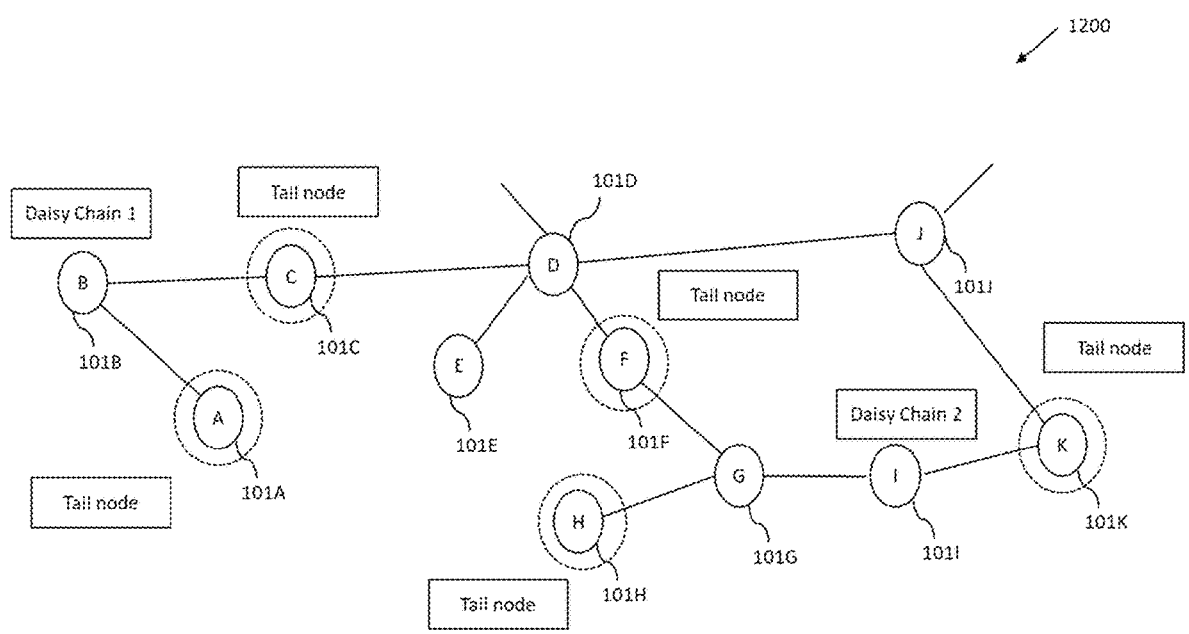
FIG. 12 illustrates an exemplary depiction of tail nodes in a daisy chain in a wireless communication network, in accordance with exemplary embodiments of the present invention.
Figure 13:
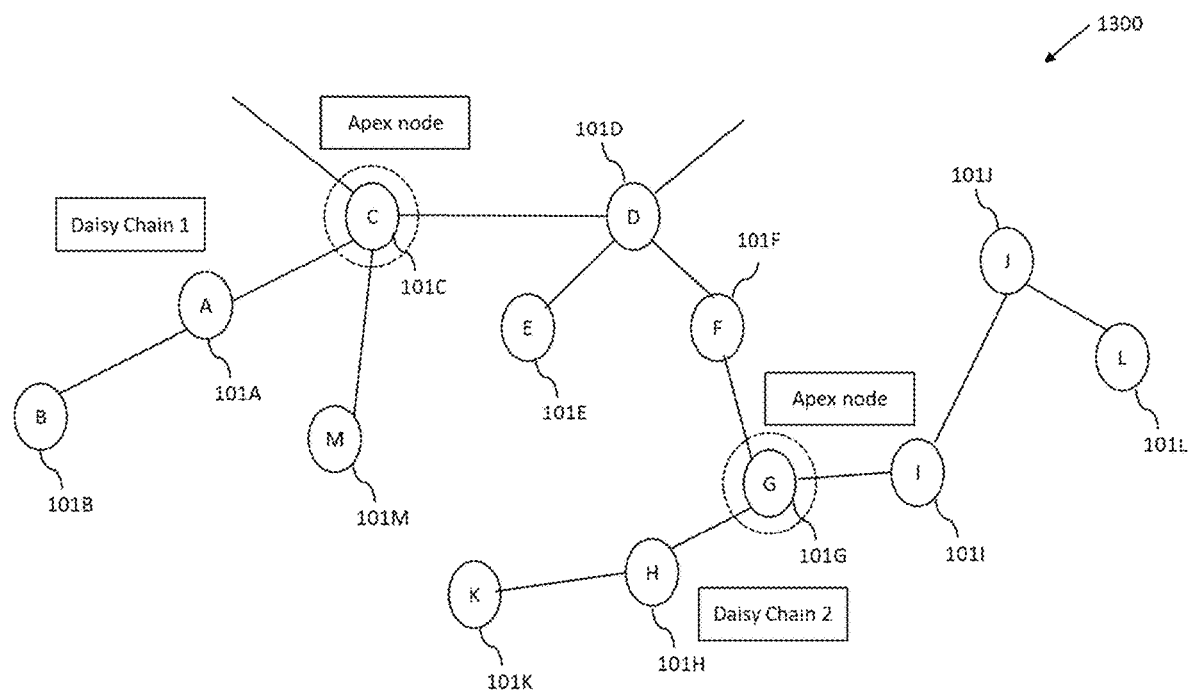
FIG. 13 illustrates an exemplary depiction of apex nodes in a daisy chain in a wireless communication network, in accordance with exemplary embodiments of the present invention.

At step [1124] if Chain length is greater than 0, the method proceeds to step [1108]. In an event, chain length is equal to 0, the Daisy chain is excluded at step [1126] from DaisyChain$_{database}$ for further iteration. Lastly, at step [1128], if the number of Daisy Chain in DaisyChain$_{database}$ is greater than 0, the method proceeds to step [1104]. In an event, the number of Daisy Chain in DaisyChain$_{database}$ equals 0, the method completes at step [1130] as all nodes of all Daisy chains are classified for time interval ΔT Referring to FIG. 12 illustrates an exemplary depiction of tail nodes in a daisy chain in a wireless communication network, in accordance with exemplary embodiments of the present invention. All nodes part of a daisy chain which has one violator neighbor is identified as a tail node. Referring to FIG. 13 illustrates an exemplary depiction of apex nodes in a daisy chain in a wireless communication network, in accordance with exemplary embodiments of the present invention. All nodes part of a daisy chain which has at least one directly connected non-violator neighbor node and has more than one violator neighbor node part of daisy chain is identified as an apex node.

Figure 14:
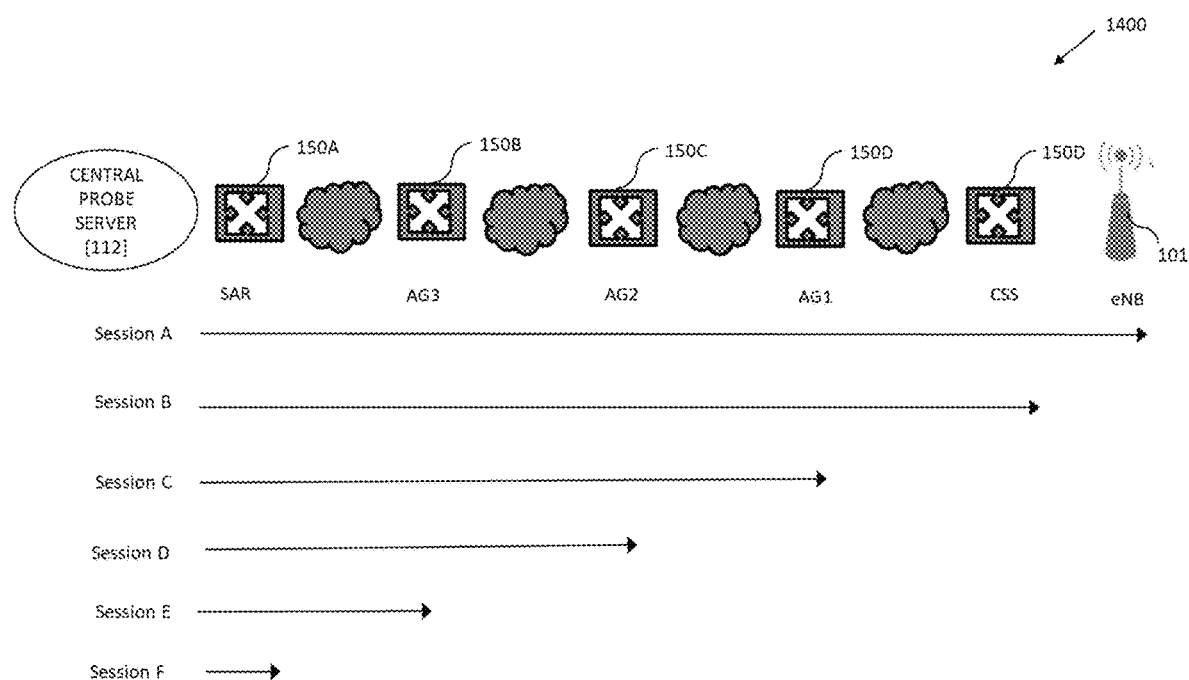
FIG. 14 illustrates an exemplary implementation of the method for identifying nodes with packet loss in a wireless communication network [100], in accordance with exemplary embodiments of the present invention.

Referring to FIG. 14 illustrates an exemplary implementation of the method for identifying nodes with packet loss in a wireless communication network [100], in accordance with exemplary embodiments of the present invention. For instance, the wireless communication system [100] comprises of a plurality of routers (CSS [150A], AG1[150B], AG2 [150C], AG3 [150D] and SAR [150E], collectively referred to as [150]) and an eNodeB [101] with TWAMP session running to each node from a central probe server

[120]. Implementing the method [300] of the present invention, significantly reduces the MTTR (mean time to resolve) for packet loss and call muting by automated accurately locating and troubleshooting node detection in the network [100] in real-time. The exemplary implementation in the network [100] encompasses a TWAMP session probe from the central probe server [112] to each IP node/eNodeB and collecting various Key Performance Indicator (for instance, packet loss, latency, jitter, VoLTE outage simulation, best-effort outage simulation, etc.) data for each flow. For instance, the TWAMP probes send 30 packets per second for voice traffic (DSCP 46) and 10 packets per second for best-effort traffic (DSCP 10). The raw data for various KPI is received with a frequency of per minute. Thus, the solution of the present invention has achieved accurate locating of the debugging points of packet loss in IP backhaul out of more than lakhs of routers and lakhs of eNodeB in the network.

The KPI (Packet loss (DSCP 10 & 46) and VoLTE outage simulation) which is exhibiting consistent violation for one hour are considered for below sectionalization:

Silo eNodeB: These are the cases where threshold violation is found at eNodeB but no threshold violation was found at gateway node for eNodeB (CSS/AG1).

Silo CSS: These are the cases where threshold violation is found at CSS router, but no violation was found on its neighbor routers.

Silo AG1: These are the cases where threshold violation is found at AG1 router, but no violation was found on its neighbor routers.

Daisy Chain: These are the cases where threshold violation is found at any router and its recursive neighbors. The Apex and Tail nodes are identified for daisy chain which are the predicted nodes responsible for packet loss in complete daisy chain.

In another embodiment, the correlation runs each hour for the consistent violators of last one hour and displays the result as sectionalizing type. All the routers part of same daisy chain is associated with a unique group id. On clicking a group id, the nodes associated with daisy chain as shown on map with dotted circle. The push report of 24 hours is mailed daily to service provider to take actions accordingly.

Thus, the present invention provides a novel solution for the technical problem of accurately locating nodes with packet loss in a wireless communication network [100]. Particularly, the solution of the present invention provides technical effect of correlating the packet loss with network topology in a given time interval, say ΔT, to provide fast and efficient troubleshooting of packet nodes for a large-scale service provider, and thereby being able to accurately locate the packet loss in lesser time for large scale operations.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for identifying nodes with packet loss in a wireless communication network comprising a plurality of nodes, the method comprising:
   establishing, by a central probe server, a TWAMP session with the plurality of nodes;
   probing, by the central probe server, the plurality of nodes for packet loss for a time duration ΔT;
   categorizing, by the central probe server, each of the plurality of nodes as one of a violator node and a non-violator node;
   retrieving, by a sectionalisation module, a topology of the at least one violator node;
   probing, by the central probe server, at least one neighboring node of the at least one violator node for packet loss for the time duration ΔT; and
   identifying, by the sectionalisation module, the at least one violator node as one of a silo node and a daisy chain node based on the probe of the at least one neighboring node.

2. The method as claimed in claim 1, wherein the at least one violator node is identified as a silo node in an event the central probe server determines no packet loss for the at least one neighboring node of the at least one violator node for the time duration ΔT.

3. The method as claimed in claim 1, wherein the at least one violator node is identified as a daisy chain node in an event the central probe server determines packet loss for the at least one neighboring node of the at least one violator node for the time duration ΔT.

4. The method as claimed in claim 3, the method further comprising:
   forming, by the sectionalisation module, at least one daisy chain comprising at least one violator node identified as daisy chain node for the time duration ΔT;
   determining, by an errant point identification module, an apex node and a tail node for the at least one daisy chain; and
   recursively processing, by the errant point identification module, the apex node of the daisy chain, wherein the apex node is replaced by at least one immediate neighboring node of the apex node based on the processing.

5. The method as claimed in claim 1, the method further comprising:
   maintaining, by the sectionalisation module, a topology database for the plurality of nodes; and
   determining, by the central probe server, the at least one neighboring node for the at least one violator node based on the topology database.

6. The method as claimed in claim 1, wherein the plurality of nodes is categorized, by the central probe server, as one of a violator node and a non-violator node based on a threshold count of packet loss.

7. A system for identifying nodes with packet loss in a wireless communication network comprising a plurality of nodes, the system comprising:
   the wireless network further comprising:
      a central probe server configured to:
         establish a TWAMP session with the plurality of nodes;
         probe the plurality of nodes for packet loss for a time duration ΔT;
         categorize each of the plurality of nodes as one of a violator node and a non-violator node;
      a sectionalisation module connected to the central probe server, said sectionalisation module configured to retrieve a topology of the at least one violator node;
      wherein the central probe server is further configured to identify at least one neighboring node of the at least one violator node for packet loss for the time duration ΔT; and wherein the sectionalisation module is further configured to identify the at least one violator node as one of a silo node and a daisy chain node based on the probe of the at least one neighboring node.

8. The system as claimed in claim 7, wherein the sectionalisation module is further configured to identify the at least one violator node as a silo node in an event the central probe server determines no packet loss for the at least one neighboring node of the at least one violator node for the time duration $\Delta T$.

9. The system as claimed in claim 7, wherein the sectionalisation module is further configured to identify the at least one violator node as a daisy chain node in an event the central probe server determines packet loss for the at least one neighboring node of the at least one violator node for the time duration $\Delta T$.

10. The system as claimed in claim 7, wherein the sectionalisation module is further configured to form at least one daisy chain comprising at least one violator node identified as daisy chain node for the time duration $\Delta T$.

11. The system as claimed in claim 10, the system further comprising an errant point identification module connected to the sectionalisation module and the central probe server, said errant point identification module configured to:
determine an apex node and a tail node for the at least one daisy chain; and
recursively process the apex node of the daisy chain, wherein the apex node is replaced by at least one neighboring node of the apex node based on the processing.

12. The system as claimed in claim 7, wherein:
the sectionalisation module is further configured to maintain a topology database for the plurality of nodes; and
the central probe server is further configured to determine the at least one neighboring node for the at least one violator node based on the topology database.

13. The system as claimed in claim 7, wherein the central probe server is further configured to plurality of nodes is categorized, by the central probe server, as one of a violator node and a non-violator node based on a threshold count of packet loss.

14. A non-transitory computer-readable medium comprising instructions for causing a computer to perform a method comprising:
establishing a TWAMP session between a central probe server and the plurality of nodes;
probing the plurality of nodes for packet loss for a time duration $\Delta T$;
categorizing each of the plurality of nodes as one of a violator node and a non-violator node;
retrieving a topology of the at least one violator node;
probing at least one neighboring node of the at least one violator node for packet loss for the time duration $\Delta T$; and
identifying the at least one violator node as one of a silo node and a daisy chain node based on the probe of the at least one neighboring node.

* * * * *

UNITED STATES PATENT AND TRADEMARK OFFICE
CERTIFICATE OF CORRECTION

PATENT NO. : 11,159,413 B2
APPLICATION NO. : 16/879623
DATED : October 26, 2021
INVENTOR(S) : Siddharth Shanker Singh, Gaurav Kumar and Rishi Raj Koul It is certified that error appears in the above-identified patent and that said Letters Patent is hereby corrected as shown below:

In the Claims

In Claim 1, Column 19, Line 66, "a TWAMP session" should read -- a Two-Way Active Measurement Protocol (TWAMP) session --.

In Claim 7, Column 20, Line 54, "a TWAMP session" should read -- a Two-Way Active Measurement Protocol (TWAMP) session --.

In Claim 14, Column 22, Line 16, "a TWAMP session" should read -- a Two-Way Active Measurement Protocol (TWAMP) session --.

In Claim 14, Column 22, Lines 16-17, "between a central probe server and the plurality of nodes" should read -- between a central probe server and a plurality of nodes --.

Signed and Sealed this
Twenty-fourth Day of May, 2022

Katherine Kelly Vidal
*Director of the United States Patent and Trademark Office*